Sept. 5, 1933. E. MENDENHALL ET AL 1,925,334
SUBMERSIBLE MOTOR WITH OIL SUPPLY PIPE
Original Filed Sept. 19, 1927
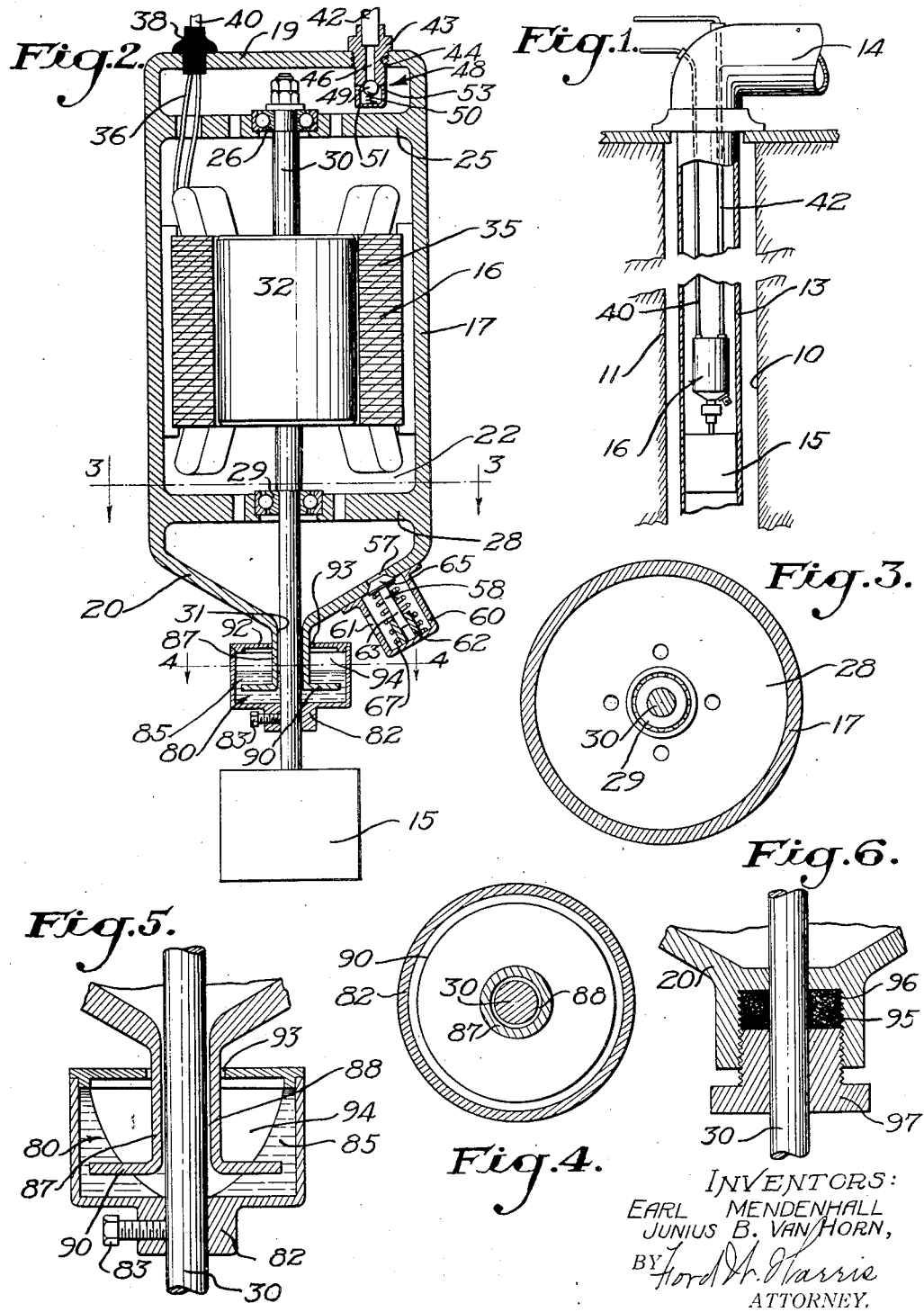
INVENTORS:
EARL MENDENHALL
JUNIUS B. VAN HORN,
BY
ATTORNEY.

Patented Sept. 5, 1933

1,925,334

UNITED STATES PATENT OFFICE 1,925,334

SUBMERSIBLE MOTOR WITH OIL SUPPLY PIPE

Earl Mendenhall and Junius B. Van Horn, Los Angeles, Calif., assignors to Menhorn, Inc., Los Angeles, Calif., a corporation of California Application September 19, 1927, Serial No. 220,381
Renewed December 5, 1932

3 Claims. (Cl. 172—36)

Our invention relates to motors and more particularly to a submersible motor.

It has heretofore been impractical to operate an electric motor below the surface of a fluid which might be injurious to the working parts of the motor should it come in contact therewith. A successful motor of this type would find numerous applications in the pumping, drilling, and propelling arts, or any art where the exertion of power below the surface of the fluid is desired. Heretofore the principal difficulty in making such a motor has been the impossibility of completely sealing the working parts of the motor from the fluid surrounding the motor.

It is an object of our invention to provide a motor which will operate submerged in a fluid which might be injurious to the working parts of the motor should it enter therein.

It is a further object of our invention to provide a device for effectively sealing the working parts of such a motor or other device from the fluid in which the shell surrounding the motor or other device is submerged.

A still further object of our invention is to provide such a seal which will be effective irrespective of the rotation of the shaft of the motor.

We have found that by placing a suitable fluid-packed seal at the junction of the shaft and the shell an effective seal is maintained at all times. Such a fluid-packed seal may be utilized in combination with a dynamically balanced submersible system such as disclosed in our co-pending application Serial 114,414, filed June 8, 1926. In that application we show and claim a system wherein the internal and external pressures are substantially equal at all times through the medium of a suitable pressure-equalizing means which cooperates with a fluid-supply pipe which is in open communication with the motor chamber to surge the internal liquid into and from this pipe so that the pressure head of the liquid in this pipe is substantially equal to the pressure head in which the motor is submerged. The present application differs in that no pressure equalization is necessarily effected.

In the present application the shell is substantially filled with an incompressible liquid supplied thereto through a suitable supply means, and it is an object of this invention to provide a device for preventing any return flow of the liquid through this supply means in combination with a pressure transfer means acting between the internal and external mediums, whereby the incompressible liquid is entrapped in the shell.

A further object of the invention is to incorporate such a pressure transfer means in a sealing device.

A further object of the invention is to provide a pressure release means for the shell which will operate at a pressure too low to permit such a displacement of the sealing liquid as will allow direct inter-communication between the liquid inside the shell and the surrounding medium.

Further objects and advantages will be made evident hereinafter.

In the drawing we illustrate one form and one application of such a submersible motor. For convenience, the motor will be described as in a deep well pump installation. It should be understood, however, that we are not limited to this use of our device, this embodiment being described only for convenience.

In the drawing,—

Fig. 1 is a utility view showing one possible use of the motor of our invention in the deep well pumping art.

Fig. 2 is a vertical sectional view of the motor of our invention.

Fig. 3 is a horizontal sectional view taken on the line 3—3 of Fig. 2.

Fig. 4 is a horizontal sectional view of the fluid-packed seal taken substantially on the line 4—4 of Fig. 2.

Fig. 5 is an enlarged vertical sectional view of our fluid-packed seal when the motor is in operation.

Fig. 6 is an alternative form of packing which may be used in place of our fluid-packed seal.

Referring specifically to the drawing, Fig. 1 shows a well 10 in which a casing 11 has been set. Extending from the surface of the ground to a point beneath the surface of the fluid in the well is a discharge pipe 13. A discharge elbow 14 is connected to this discharge pipe 13 at the surface of the ground. Suitably held in the discharge pipe 13 is a pump 15 adapted to be operated by a motor 16 of our invention. The motor 16 is placed immediately above the pump 15 and suitably secured thereto by means not shown.

As best shown in Figs. 2 to 5 inclusive, the motor 16 of our invention has a cylindrical shell 17 closed at its top by an upper member 19 and at its lower end by a conical bottom 20. The shell 17, the upper member 19, and the conical bottom 20 define a motor chamber 22.

Extending across the motor chamber 22 near the upper end thereof is an upper intermediate wall 25 supporting a bearing 26 of any conventional design. Also extending across the motor chamber 22 near the bottom thereof is a lower intermediate wall 28 supporting a bearing 29. A shaft 30 is adapted to journal in the bearings 26 and 29 and to extend through an opening 31 in the lower part of the conical bottom 20. A rotor 32 is carried by this shaft between the intermediate walls 25 and 28. Adapted to rotate the rotor 32 is a stator winding 35 energized by conductors 36 which extend through an insulator 38 secured in the upper member 19. These conductors are carried to the surface of the ground in a pipe 40 where they connect with a suitable source of electric energy, not shown.

Also extending from the surface of the ground is a pipe 42 which is secured to a nipple 43. The nipple 43 is threaded into the upper member 19 as indicated at 44, and has an opening 46 which communicates with the interior of the pipe 42. The lower end of the nipple 43 forms a check valve structure 48, as best shown in Fig. 2. The lower end of the opening 46 has a countersunk seat adapted to receive a ball 49 which is normally pressed upward into contact with the seat by a spring 50 which bears against the bottom of a lower projection 51 of the nipple 43. The ball 49 and spring 50 operate in a cup which communicates with the motor chamber through openings 53, as best shown in Fig. 2. The pipe 42 is adapted to conduct a lubricating medium from the surface of the ground to the motor chamber 22. When such a medium is forced therethrough, the ball 49 is lowered against the action of the spring 50 and the lubricating medium passes through the openings 53 into the motor chamber 22. As soon as this flow is stopped, the spring 50 forces the ball 49 into contact with the seat of the nipple 43, thus effectively closing the opening 46 and preventing any fluid from returning through the pipe 42 from the motor chamber 22.

A hole 57 in the conical bottom 20 communicates between the motor chamber 22 and the exterior of the shell 17. Adapted to close the opening 57 is a pressure relief valve 58 of conventional design. This valve 58 is supported in a cage 60 having openings 61 communicating with the interior thereof. A boss 62 in the bottom of the cage 60 journals a stem 63 of a valve member 65 which is adapted to seat in the opening 57 and effectively close it. A spring 67 holds the valve member 65 normally in contact with the seat of the opening 57. Any excess of pressure in the motor chamber 22 over the pressure outside of the motor 16 will cause the pressure release valve 58 to open, allowing lubricating medium to escape, thus approximately equalizing the pressures between the inside and outside of the shell 17. The reverse, however, is not true, for if the outside pressure be greater than the inside pressure, the valve member 65 will only be pressed closer into contact with the seat of the opening 57.

A fluid-packed emulsion-preventing seal 80 of our invention is mounted at the junction of the shaft 30 and the conical bottom 20. As best shown in Figs. 2, 4, and 5, this seal 80 is composed of a cup 82 secured to the shaft 30 by a set screw 83. This cup is placed below the conical bottom 20 and is adapted to receive a body of mercury 85. Extending downward from the conical bottom 20 concentric with the opening 31 is an apron 87 which extends below the level of the mercury 85 in the cup 82. The apron 87 is also concentric with the shaft 30, but separated therefrom by a clearance space 88. Extending radially outward from the apron 87 is a plate 90 which is slightly less in outer diameter than the inside diameter of the cup 82, as best shown in Fig. 4. A cover 92 has an opening 93 slightly larger than the outer diameter of the apron 87, and is adapted to surround this apron. The cover 92 is suitably secured to the top of the cup 82 by means not shown. A space 94 above the mercury in the cup 82 is in communication with the fluid surrounding the motor through the clearance space between the opening 93 and the apron 87. The clearance space 88 between the apron 87 and the shaft 30 is in communication with the motor chamber 22. Thus, if the shaft 30 is not rotating and the pressure in the motor chamber 22 is equal to the pressure of the fluid in the space 94, the mercury level will be constant throughout the interior of the cup 82. If, however, the pressure in the chamber 94, which would be equal to the pressure of the fluid surrounding the motor 16, were to be greater than the pressure in the motor chamber 22, the mercury would rise in the clearance space 88. This displacement would be in proportion to the difference in pressure. Vice versa, if the pressure inside the motor chamber 22 becomes greater than the pressure of the external fluid, the mercury in the clearance space 88 will be at a lower level than the mercury in the space 94.

Fig. 5 shows the seal 80 when the shaft 30 is rotating. In this case the cup 82 is rotated with the shaft and the mercury contained therein also rotates. The centrifugal force on the mercury tends to throw it outward into a forced vortex, the upper surface of which will be a paraboloid. This condition is clearly shown in Fig. 5. The plate 90 is so designed, however, that its outer edge will always be beneath the surface of the mercury irrespective of the rotation of the shaft 30. Thus, a fluid-packed seal is always maintained between the exterior and interior of the motor chamber 22.

Various modifications of this seal may be used without departing from the spirit of our invention. It is within the scope of our invention to use a fluid-packed seal in which the fluid does not rotate, so designing the seal that an apron 87 rotates relative thereto. Such a seal is effective on shafts having a low speed of rotation. When used on high speed shafts, however, there is a marked tendency for the external fluid and the fluid in the motor chamber 22 to emulsify in the mercury 85 and thus cause some slight inter-contact between these two fluids. By using the seal shown in the drawing this condition is obviated, for by rotating the mercury we have found that no emulsification takes place due to the high centrifugal force on the mercury itself relative to the lower centrifugal force on the fluids in contact therewith.

An added feature of the seal construction shown is the fact that it acts as a pressure-transfering means between the lubricating medium and the external fluid, and that should an excess of pressure build up in the motor chamber 22 over the pressure outside thereof and the pressure release valve 58 not operate, lubricating medium would be forced through the clearance space 88. When the mercury level in this space is pushed a short distance downward or outward, depending upon whether the shaft is stationary or rotating, lubricating medium will pass around the outer edges of the plate 90 escaping into the space 94. It should be noticed that a relatively small difference in pressure would effect this result. However, if the pressure in the chamber 94 should build up an excess of that in the chamber 22, mercury would be forced upward in the clearance space 88. If this difference in pressure were great enough all of the mercury above the plate 90 would be forced into the clearance space 88 and into the conical bottom 20. At this time fluid would pass from the space 94 into the motor chamber 22, an extremely undesirable condition. It should be noticed, however, that the difference in pressure in this case would be much greater than the difference in pressure required to force the mercury beyond the outer edges of the plate 90. This is because of the height of the clearance space 88 through which the mercury would have to travel. It is within the scope of our invention to extend this space 88 to any convenient length, thus forming a mercury-sealed valve which will readily pass a fluid in one direction and greatly impede a flow in an opposite direction.

It should be understood that various modifications of our invention could be used. For instance, it is entirely possible to dispense with the pressure relief valve 58, allowing any excess of lubricating medium to pass downward through the space 88 and around the outer edges of the plate 90 into the fluid surrounding the motor. We prefer, however, to use the pressure release valve, and so adjust it that lubricating medium will escape through it to the exterior of the motor before passing around the plate 90.

It is also possible to dispense with a fluid-packed seal, as shown in Figs. 2 to 5 inclusive, and substitute therefor a packing of ordinary design such as shown in Fig. 6. Here a packing medium 95 is placed in a chamber 96 extending from the conical bottom 20. The packing 95 is suitably compressed by a packing nut 97 which is threadedly secured in the chamber 96. By using a high grade packing such a sealing means will sometimes operate over long periods of time. Such a packing, however, is open to the objection that emulsification between the lubricating medium and the fluid will take place around the shaft 30 in case of any inward leakage. In using such a packing, it is necessary to keep the pressure in the motor chamber 22 in excess of the pressure of the fluid outside of the motor. This can be accomplished by suitably adjusting the pressure relief valve 58, or entirely dispensing therewith, and supplying a lubricating medium through the pipe 42 in such quantities that an excess of pressure will be maintained in the motor chamber 22 over that outside thereof. In this event any leakage will tend to be downward around the shaft 30 and will be a leakage of lubricating medium into the external fluid rather than vice versa.

In the operation of our invention, the motor and pump are suitably lowered and secured in place, after which lubricating medium is forced through the pipe 42 until it is certain that the motor chamber 22 is completely filled therewith. Any excess of lubricating medium will be discharged into the fluid surrounding the motor through the pressure release valve 58. Lubricating medium may be continuously or intermittently supplied through the pipe 42 to the motor chamber 22. Either of these methods will tend to continually renew the lubricating medium in the motor chamber 22, allowing the excess to be discharged into the fluid surrounding the motor.

It is also possible to run the motor 16 over long periods of time without supplying additional lubricating medium through the pipe 42. In this event no leakage occurs to the outside of the motor and no fluid reaches the inside thereof due to the action of the pressure relief valve 58 and the fluid-packed seal 80.

Certain features of this invention are not limited to a motor construction, but are valuable irrespective of the mechanism positioned inside the shell 17.

We claim as our invention:

1. In a motor adapted to be submerged in a fluid which may be injurious to the working parts of said motor, the combination of: walls forming a motor chamber, said motor chamber being substantially filled with a lubricating medium; a motor supported in said motor chamber, said motor having a shaft extending through at least one of said walls of said motor chamber; means for sealing said shaft and said walls in fluid-tight relationship; a pipe extending above the surface level of said fluid, said pipe being adapted to communicate with said motor chamber and to supply lubricating medium thereto; and a pressure release means for allowing a passage of lubricating medium out of said motor chamber should the difference in pressure between said fluid and said lubricating medium exceed a predetermined value.

2. In a motor adapted to be submerged in a fluid which may be injurious to the working parts of said motor, the combination of: walls forming a motor chamber, said motor chamber being substantially filled with a lubricating medium; a motor supported in said motor chamber, said motor having a shaft extending through at least one of said walls of said motor chamber; means for sealing said shaft and said walls in fluid-tight relationship; a pipe extending above the surface level of said fluid, said pipe being adapted to communicate with said motor chamber and to supply lubricating medium thereto; a pressure release means for allowing a passage of lubricating medium out of said motor chamber should the difference in pressure between said fluid and said lubricating medium exceed a predetermined value; and means for preventing a return flow of said lubricating medium into said pipe.

3. In combination: a shell defining a motor chamber; a rotatable shaft extending from said shell; a motor in said motor chamber and operatively connected to said shaft to rotate same; means for supplying a liquid medium to said motor chamber; means for retaining a body of sealing medium at the junction of said shaft and said shell, said sealing medium being in pressure-transferring relationship with said liquid medium and with the medium around said shell; and a pressure release means for allowing an escape of said liquid medium from said shell before the sealing action of said sealing medium is destroyed by a differential pressure between said liquid medium and said medium around said shell.

EARL MENDENHALL.
JUNIUS B. VAN HORN.